Figure 1:
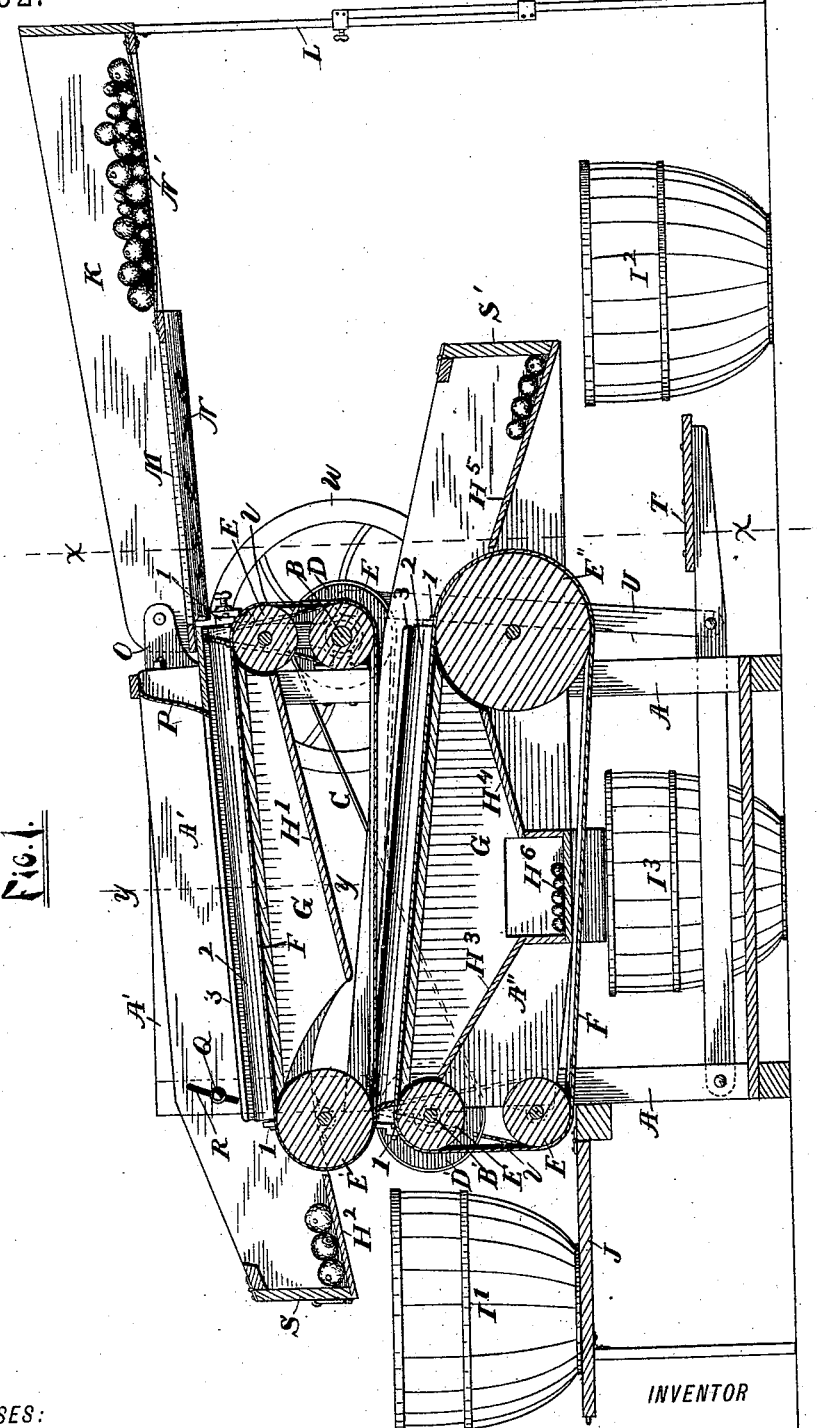

(No Model.)  2 Sheets—Sheet 1.

H. H. HUTCHINS.
ASSORTING MACHINE.

No. 456,092. Patented July 14, 1891.

WITNESSES:

INVENTOR
Henry H. Hutchins
BY
Moulton & Rogers
ATTORNEYS (No Model.) 2 Sheets—Sheet 2.
H. H. HUTCHINS.
ASSORTING MACHINE.
No. 456,092. Patented July 14, 1891.
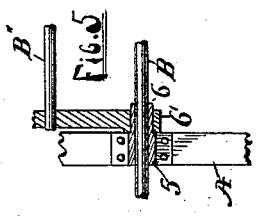
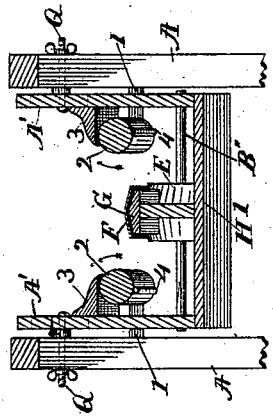
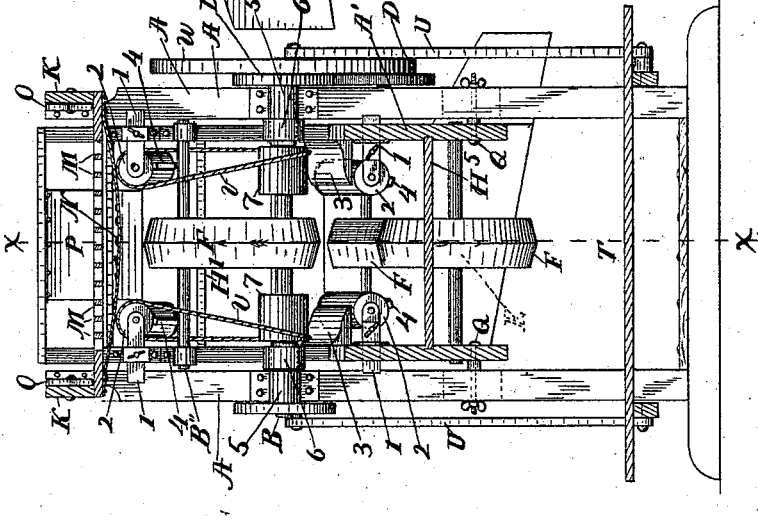
WITNESSES:
INVENTOR
Henry H. Hutchins:
BY
Moulton & Rogers
ATTORNEYS

UNITED STATES PATENT OFFICE.

HENRY H. HUTCHINS, OF GANGES, MICHIGAN.

ASSORTING-MACHINE.

SPECIFICATION forming part of Letters Patent No. 456,092, dated July 14, 1891.

Application filed January 30, 1890. Serial No. 338,693. (No model.)

*To all whom it may concern:*

Be it known that I, HENRY H. HUTCHINS, a citizen of the United States, residing at Ganges, in the county of Allegan and State of Michigan, have invented certain new and useful Improvements in Assorting-Machines; and I do hereby declare the following to be a full, clear, and exact description of the invention, such as will enable others skilled in the art to which it appertains to make and use the same.

My invention relates to assorting-machines for fruit and vegetables; and it consists in the construction, combination, and arrangement of the various parts, as hereinafter described, and particularly pointed out in the claims, reference being had to the accompanying drawings, wherein—

Figure 1 is a longitudinal vertical sectional view on the line $x\,x\,x\,x$ of Fig. 2; Fig. 2, a rear end elevation, partly in section, on the line $x\,x$ of Fig. 1; Fig. 3, a detail showing a vertical section of the upper system on the line $y\,y$ of Fig. 1; Fig. 4, a side elevation with the end of lower spout and door S' of Fig. 1 broken away; Fig. 5, a detail on line $z\,z$ of Fig. 4, showing the method of pivoting the systems to the frame.

Like letters and figures of reference indicate like parts throughout the drawings.

The essential features of this machine are two or more inclined casings pivoted and arranged in a suitable frame, having assorting devices arranged within the casings and provided with means of operating the assorting devices, driven by power applied in any suitable manner.

In the drawings, A represents the frame; A' A'', side boards of the upper and lower casings, respectively. Each casing and its mechanism constitute a separate assorting system, and each system is adapted to assorting a particular size of fruit; and in the device shown and illustrated the systems are arranged one above the other and operate in conjunction, as hereinafter fully explained. Each system is pivoted to the frame A upon the shaft which operates the assorting devices, respectively, said shafts being lettered B B', which shafts are journaled in boxes 5, which are secured to frame A by bolts. Each box 5 has an inwardly-projecting sleeve 6, Fig. 5, upon which the side boards are pivoted for vertically adjusting the opposite end and regulating the vertical adjustment of the various casings. The upper system is connected to its pivot B by a bracket, secured to the ends of the side boards, Fig. 4, while the lower system is provided with a box secured to the end of the side board A'', corresponding to box 5, (without its sleeve 6,) which is not shown in the drawings, being a common device for this purpose and arranged behind the box 5 of the shaft B', as shown in Fig. 4. This adjustment is provided for by the slot R in the side boards A' A'', in which slot is placed the binding-bolt Q, secured in the frame A. The two shafts B B' are provided with pulleys D D', connected by a crossed belt C. Each casing is provided with a bottom board upon which rests a T-shaped bridge G, arranged in the middle and extending from end to end of the bottom board. At the lower end of each casing are arranged large pulleys E' E'', and at the upper end of each casing are arranged small pulleys E E E E. The pulleys E on the shafts B and B' are driving-pulleys. The others are idle. Each system is provided with a series of three of said pulleys E, and each series is provided with a belt F, arranged to travel along the bridge G, for conducting the fruit along the casing. These two systems of pulleys and belts are driven by foot-power applied to a treadle T, pivoted to the frame and connected to the crank balance-wheel W by rod U. Upon the inside of the side boards A' A'', respectively, are arranged the rollers 2, provided with a longitudinal flange or rib 4. Said rolls are journaled in horizontally-adjustable hangers 1 1, secured to the end of the side boards, and are rotated from the driving-shafts by suitable pulleys and belts. (See 7 V in Fig. 2 for illustration of method of rotating the upper set.) The lower set of rollers is rotated by similar devices applied at the upper end of the lower casing and partially shown in Fig. 1. An inclined shelf 3 is arranged above the rollers to keep the fruit from lodging between the side of the casing and the rollers.

The fruit to be assorted is placed in a hopper K, having at its upper end a tight bottom N' and at its lower end a grated bottom M, and underneath is placed an apron N to receive dirt and leaves which pass through the grates. Said hopper is provided with an extensible leg L and is pivoted to a bracket O, arranged and secured to the side of side boards A, and is adapted to fold over and rest on the upper casing for compactness in moving. P is an apron or screen which hangs across the upper end of the upper casing, of flexible material, and spreads the fruit somewhat upon its entering upon the incline. Power being applied to the treadle, the belt F moves longitudinally down the casing and is prevented from sagging by bridge G. Rolls 2 revolve in the direction indicated by the arrows in Fig. 3. The fruit, after leaving the hopper K, is carried downward by the belt F and stirred by rollers 2. The distance between the periphery of the rollers 2 and the sides of bridge G determines the size of fruit that is to constitute the different grades. Fruit too large to pass between the rolls and bridge is carried to the lower end of the upper casing, and, falling upon the bottom $H^2$ of the spout, is conducted into the basket I', which rests upon the table J. The spouts are provided with doors S' S to keep the fruit from escaping from the machines while the baskets are being changed. The smaller fruit falls through between rollers 2 and bridge G, and is conducted by bottom board H' to the upper end of the casing beneath, having a like set of rolls, belt, and bridge and side boards A'', and fruit too large to pass through between rolls and bridge passes through the box and is conducted by spout, having bottom board $H^5$, to basket $I^2$, which rests upon the floor, while the smaller fruit, after passing through between the rolls and bridge, is conducted by centrally-inclined bottom boards $H^3$ and $H^4$ into a spout $H^6$, and delivered into a basket $I^3$ at the side of the machine.

One or more casings or systems may be pivoted in the same frame, adapted to assort into two or more grades; but I prefer two casings or boxes adapted to assort into three grades, as described.

What I claim, and desire to secure by Letters Patent of the United States, is—

1. In assorting mechanism, a box or casing provided with an inclined bottom pivoted in a suitable casing, a bridge secured to said bottom, a roll journaled to said box arranged parallel to said bridge, and a belt for rotating said roll, substantially as set forth.

2. In assorting mechanism, in combination with a box or casing having an inclined bottom and pivoted in a suitable casing, a bridge arranged along said bottom near the middle, rolls arranged upon each side of and parallel to said bridge, and belts and shafting for rotating said rolls, substantially as set forth.

3. The assorting-rollers 2, provided with ribs or flanges 4, in combination with the bridge G and belt F, arranged substantially as set forth.

4. An assorting mechanism consisting of a box having an inclined bottom and pivoted to adjust in a suitable frame, a bridge G, arranged and secured to the bottom of said box, a belt F, arranged to travel along said bridge, and an assorting-roll, as 2, having a rib 4 and a shaft, pulley, and belt for rotating said roll, substantially as set forth.

5. An assorting mechanism consisting of a series of casings, arranged one above the other, pivoted in a suitable frame, each casing having an inclined bottom, a bridge G, and a belt F, arranged to travel along said bridge, pulleys for operating said belt, rolls arranged upon each side of the bridge journaled to the casing, belts for rotating said rolls, and an inclined shelf, as 3, secured above the rolls, substantially as and for the purposes set forth.

In testimony whereof I affix my signature in presence of two witnesses.

HENRY H. HUTCHINS.

Witnesses:
DENNIS L. ROGERS,
LUTHER V. MOULTON.